US007337636B2

(12) United States Patent
Witchey

(10) Patent No.: US 7,337,636 B2
(45) Date of Patent: Mar. 4, 2008

(54) ANTI-THEFT DEVICE

(76) Inventor: Bryan Witchey, 209 Fairway Cir., Cross Junction, VA (US) 22625

( * ) Notice: Subject to any disclaimer, the term of this patent is extended or adjusted under 35 U.S.C. 154(b) by 0 days.

(21) Appl. No.: 11/391,457

(22) Filed: Mar. 29, 2006

(65) Prior Publication Data

US 2006/0218977 A1 Oct. 5, 2006

Related U.S. Application Data

(60) Provisional application No. 60/667,908, filed on Mar. 29, 2005.

(51) Int. Cl.
*F16C 3/00* (2006.01)
*G05G 5/00* (2006.01)

(52) U.S. Cl. .................... 70/14; 70/18; 70/19; 70/162; 70/174; 70/178; 70/202; 70/232; 70/417; 70/418

(58) Field of Classification Search .................... 70/14, 70/418, 175–180, 18, 19, 232, 2–13, 416, 70/417, 423, 424, 209, 198–203, 455, 174, 70/158–164; 292/256, 256.6, 307 R, 307 B, 292/288

See application file for complete search history.

(56) References Cited

U.S. PATENT DOCUMENTS 122,396 A * 1/1872 McIlhenny .............. 292/307 B
1,118,303 A * 11/1914 Meyer .......................... 70/448
1,221,354 A * 4/1917 Mitchell ....................... 70/163
1,251,591 A * 1/1918 Stoddart ....................... 70/299
1,561,018 A * 11/1925 Peelle ......................... 292/177
1,596,083 A * 8/1926 Cyganczuk .................. 70/202
2,512,028 A * 6/1950 MacMillan .................. 70/293
3,347,069 A * 10/1967 Hollingshead, Jr. ............ 70/63
3,636,742 A * 1/1972 Raney ......................... 70/424
4,178,027 A * 12/1979 Charron ...................... 292/346
4,373,851 A 2/1983 Confoey
4,417,644 A * 11/1983 Brogard ...................... 180/287
5,024,303 A * 6/1991 Kosloff ....................... 188/300
5,074,606 A * 12/1991 Priola et al. ................ 292/346
5,544,505 A * 8/1996 McIntosh et al. .............. 70/18
5,560,235 A * 10/1996 Aucoin ........................ 70/455
5,775,139 A * 7/1998 Sellers .......................... 70/14

(Continued)

OTHER PUBLICATIONS

Advertisement for SleevLock, 2 pages.

*Primary Examiner*—Lloyd A. Gall
(74) *Attorney, Agent, or Firm*—Christopher Wood; Wood & Eisenberg, PLLC

(57) ABSTRACT

An anti-theft device including a shaft divided into first and second brackets and a locking mechanism. First bracket defines first 300*a* and second 320*a* edges, second bracket defines first 300*b* and second 320*b* edges. First 320*a* and second 320*b* edges are hingedly connected such that first and second brackets can be opened or closed. Edge 300*b* includes at least one inner-flange and a locking tab. First bracket 260*a* includes sidewall 340*a*. Locking tab and sidewall 340*a* respectively define apertures 440 and 390. Apertures 440 and 390 are aligned upon closing the first and second brackets. When the first and second brackets are in a closed configuration, the locking mechanism is in operable communication with apertures 440 and 390 such that the locking mechanism is capable of reversibly locking first and second brackets together, and wherein the at least one inner flange prevents illicit tampering of the locking mechanism.

3 Claims, 7 Drawing Sheets

U.S. PATENT DOCUMENTS

| | | | | |
|---|---|---|---|---|
| 5,850,796 | A * | 12/1998 | Cislo | 109/51 |
| 6,095,574 | A * | 8/2000 | Dean | 292/164 |
| 6,393,880 | B1 * | 5/2002 | Vance, Sr. | 70/174 |
| 6,405,570 | B1 | 6/2002 | Middleton et al. | |
| 6,434,982 | B1 * | 8/2002 | Rowland | 70/211 |
| 6,470,717 | B1 * | 10/2002 | Yu | 70/25 |
| 6,520,067 | B1 * | 2/2003 | Hunt et al. | 92/23 |
| 6,553,797 | B2 * | 4/2003 | Witchey | 70/209 |
| 6,874,338 | B1 * | 4/2005 | Hunt et al. | 70/14 |

* cited by examiner

ANTI-THEFT DEVICE

CROSS-REFERENCE TO RELATED APPLICATIONS

This application claims the benefit of priority from U.S. Provisional Patent Application Ser. No. 60/667,908, filed Mar. 29, 2005, the entire contents of which are incorporated herein by reference.

STATEMENT REGARDING FEDERALLY SPONSORED RESEARCH OR DEVELOPMENT

Not Applicable.

FIELD OF THE INVENTION

The present invention relates generally to anti-theft devices for vehicles. More specifically, the invention is an anti-theft device that helps prevent unauthorized control and use of a backhoe and a range of vehicles that make use of hydraulic arms or extensions such as steering arms in semi-type construction vehicles such as, but not limited to, backhoes, articulating loaders and trucks, dozers, trenchers, excavators, scissor lifts and man-lifts.

BACKGROUND OF THE INVENTION

The related art of interest describes various locking devices, but none discloses the present invention. There is a need for a locking device that prevents the theft of key construction equipment such as a backhoe and articulated loaders if a thief has an ignition key or other way to start up the vehicles' engines.

Backhoes and other construction equipment such as, but not limited to, articulated loaders, are vulnerable to misuse and theft, particularly at night when construction equipment are often left unattended on construction sites. Thieves often have little difficulty in illicitly starting up an unattended backhoe or articulated loader with or without an engine ignition key. Once a backhoe's engine is running, the backhoe may be driven onto a trailer or flat bed truck and stolen. Such thefts lead to higher insurance premiums, which inevitably translate into higher construction costs.

Several efforts have been made to address these problems. U.S. Pat. No. 4,373,851, issued Feb. 15, 1983 to Confoey describes a bulldozer and backhoe locking device for prevention of theft of heavy equipment having hydraulic pistons and cylinders by locking the blade or bucket against the ground by placement of an elongated sleeve pivoted together along one edge over the extended piston rod for engagement against the end of the piston and cylinder assembly and the boom of the backhoe or the blade of the bulldozer.

U.S. Pat. No. 6,405,570 issued Jun. 18, 2002 to Middleton et al., describes anti-theft device for removably placing around the cylinder of a stabilizer leg of heavy machinery such that the cylinder may not be retracted. The anti-theft device includes a shaft. The shaft is elongate and has a first and second end. The shaft is hollow such that the shaft has an inner surface and an outer surface. Each of the first and second ends is open. The shaft is divided into two substantially equal portions along a line orientated generally parallel to a longitudinal axis of the shaft. Each of the portions has a pair of free edges. A first free edge of a first portion is hingedly coupled to a first free edge of the second portion such that the second free edges are abuttable. A closed position is defined by the second free edges being abutted.

A latching means coupled to the shaft removably latches the first portion to the second portion in the closed position.

SUMMARY OF THE INVENTION

The present invention is an anti-theft device comprising a shaft divided into first and second brackets, the first bracket defines first 300*a* and second 320*a* edges, the second bracket defines first 300*b* and second 320*b* edges, wherein first 320*a* and second 320*b* edges are hingedly connected such that the first and second brackets can be opened or closed, edge 300*b* comprises at least one inner flange and a locking tab, locking tab defines an aperture 440, wherein sidewall 340*a* includes an aperture 390, wherein the aperture 440 and the aperture 390 are aligned upon closing first and second brackets. When the first and second brackets are in a closed configuration, the locking mechanism is in operable communication with apertures 440 and 390 such that the locking mechanism is capable of reversibly locking first and second brackets together, and wherein the at least one inner flange prevents illicit tampering of the locking mechanism.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
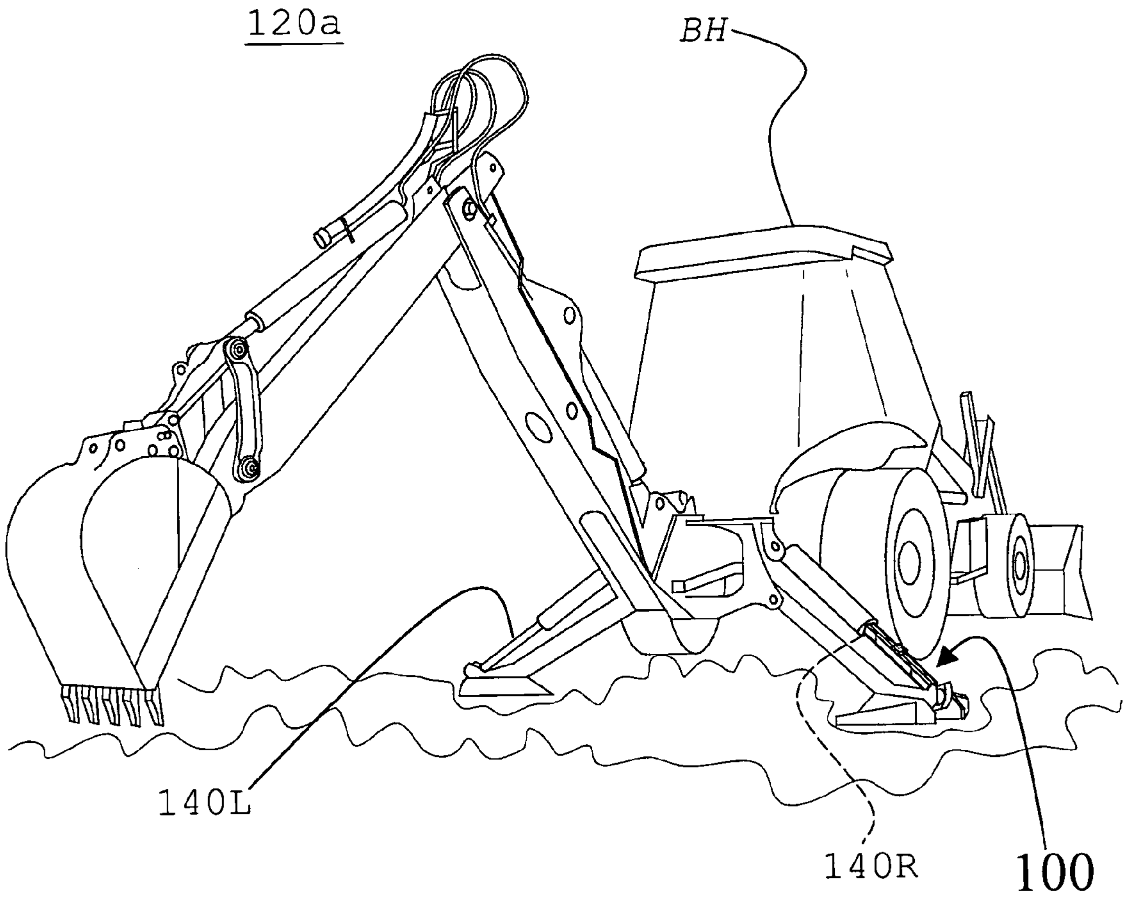
FIG. 1 is an environmental perspective view of an anti-theft device of the present invention fitted to a backhoe.

The present invention is directed to anti-theft devices for vehicles. More specifically, the invention is an anti-theft device that helps prevent unauthorized control and use of a backhoe and a range of vehicles that make use of hydraulic arms or extensions such as steering arms in semi-type construction vehicles such as articulating loaders.

Referring to the FIGURES in general, the anti-theft device of the present invention is denoted by the reference numeral 100 as a whole. It should be understood that the terms "aperture" and "hole" are regarded as equivalent terms herein.

Figure 1A:
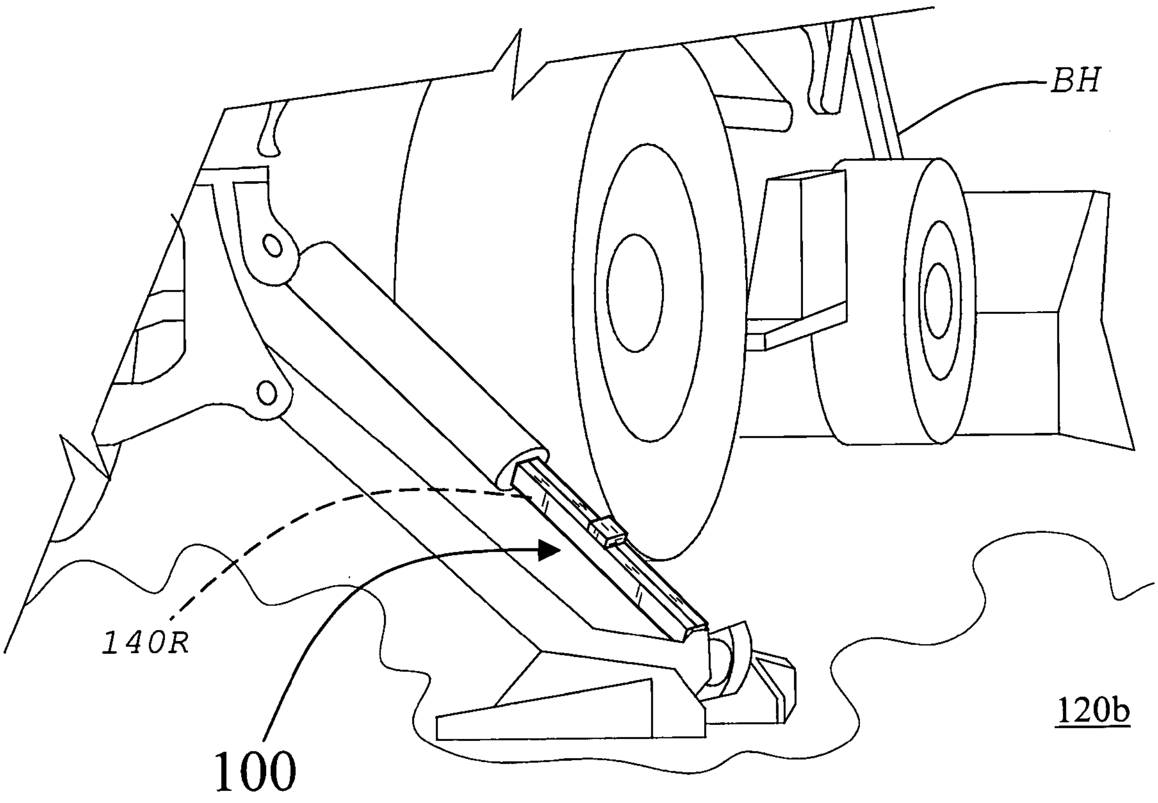
FIG. 1A is a close-up view of the anti-theft device of FIG. 1.

FIG. 1 is an environmental perspective view 120*a* of an anti-theft device 100 according to the invention. The anti-theft device 100 is shown fitted to a backhoe BH, and more particularly to the backhoe's extended right rear stabilizer leg cylinder 140R. For comparison, the left extended rear stabilizer leg cylinder 140L of the backhoe BH is shown not fitted with the anti-theft device 100. FIG. 1A shows a closer environmental perspective view 120*b* of the anti-theft device 100 fitted to an extended stabilizer leg cylinder 140R. It should be understood that the anti-theft device can also be fitted to hydraulic steering cylinders found, for example, on semi-type construction vehicles such as, but not limited to, articulating loaders.

Figure 2:
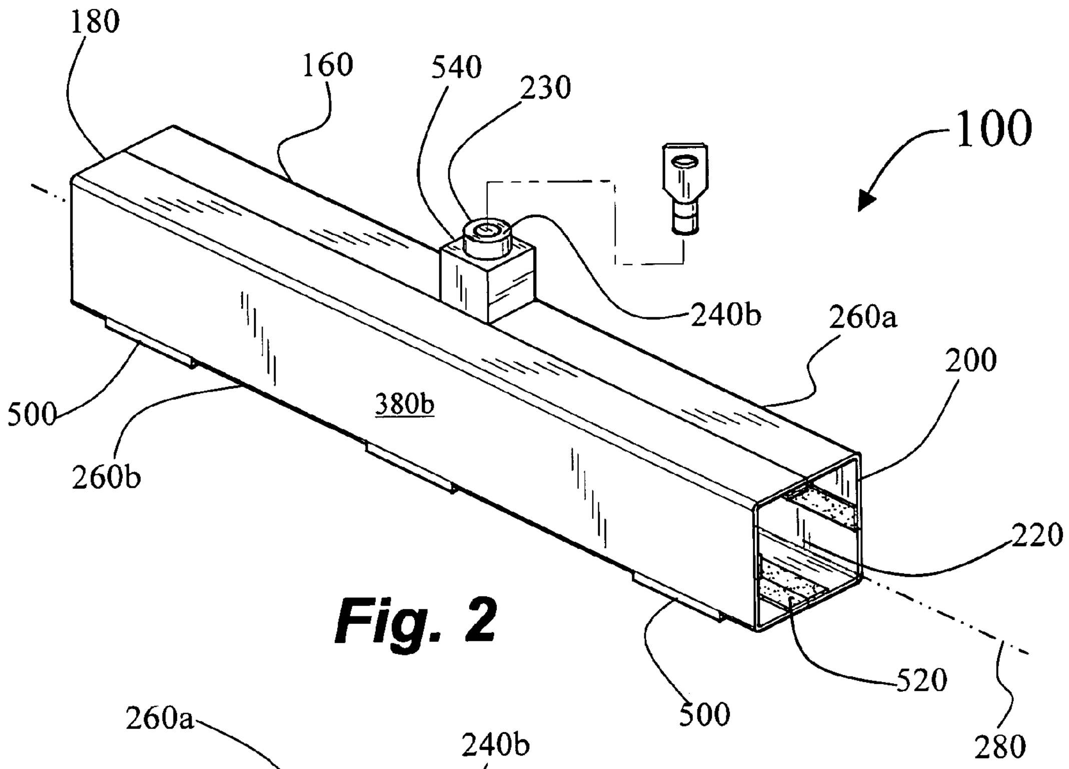
FIGS. 2 and 3 are perspective views of an anti-theft device of the present invention in open and closed configurations, respectively.

Referring to FIG. 2, the anti-theft device 100 defines a generally elongated shaft 160. The shaft 160 has first and second opposite open ends 180 and 200, respectively. The shaft 160 defines a hollow interior 220 for accommodating a hydraulic cylinder such as, but not limited to, a rear stabilizer leg cylinder 140L.

Figure 3:
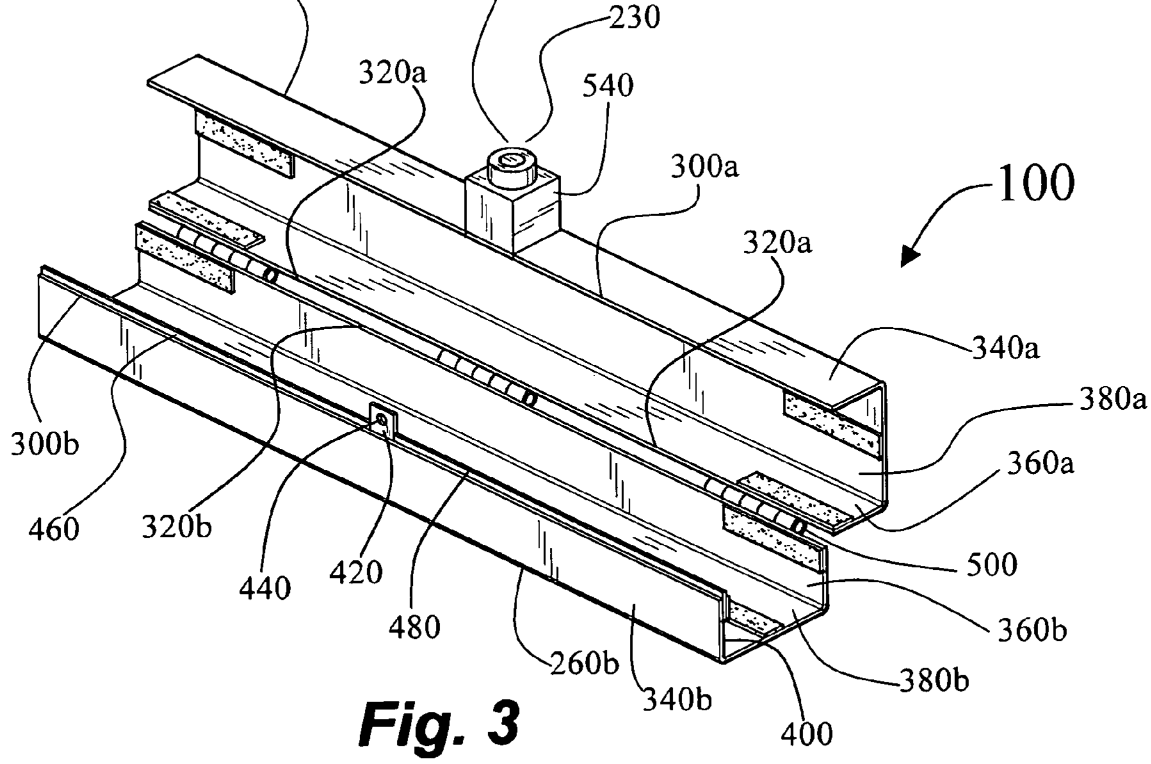

Referring to FIGS. 2 and 3, the shaft 160 is split into first 260*a* and second 260*b* elongated brackets. Each of the first 260*a* and second 260*b* elongated brackets generally has a U-shaped cross section traverse to the longitudinal axis 280 of shaft 160 and as seen when viewed shaft 160 is open or viewed end-on. The first and second elongated brackets 260*a* and 206*b* are aligned generally parallel to the longitudinal axis 280 of the shaft 160. The first elongated bracket 260*a* defines first 300*a* and second 320*a* longitudinal edges, and the second elongated bracket 206*b* defines first 300*b* and second 320*b* longitudinal edges. The first bracket 260*a* comprises opposite sidewalls 340*a* and 360*a*, and a generally longitudinal central sidewall 380*a*. The second bracket 206*b* comprises opposite sidewalls 340*b* and 360*b*, and a generally longitudinal central sidewall 380*b*. The sidewall 340*a* defines hole or aperture 390 (shown in FIG. 2A) through which a lock pin 560 can be reversibly inserted. The sidewall 340*b* defines interior surface 400.

A locking mechanism 230 is located at some point on sidewall 340*a* and between opposite ends 180 and 200. The locking mechanism 230 can be any suitable locking mechanism and can comprise, for example, a key operated barrel shaped spring lock 240*b*. (The key operated barrel shaped spring lock is described in U.S. Pat. No. 6,553,797 issued Apr. 29, 2003 to Witchey (the barrel shaped spring lock is shown as part number 26 in the '797 Witchey patent)). U.S. Pat. No. 6,553,797 is incorporated herein by reference in its entirety).

Figure 4:
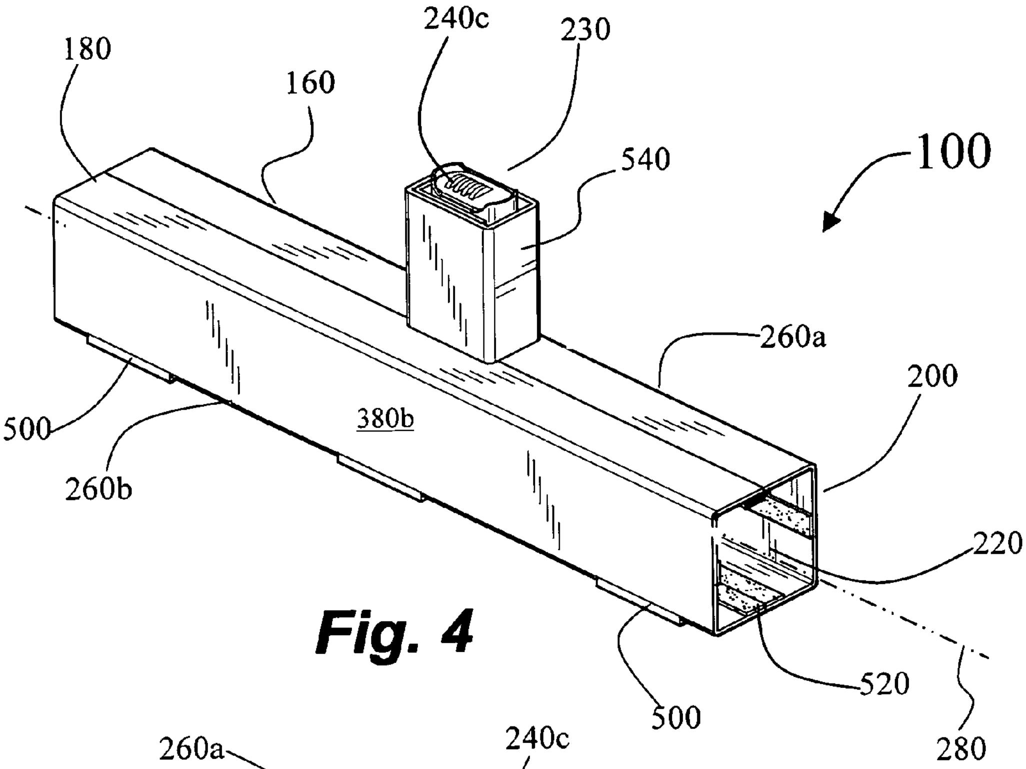
FIGS. 4 and 5 are perspective views of an anti-theft device of the present invention in open and closed configurations, respectively.
Figure 5:
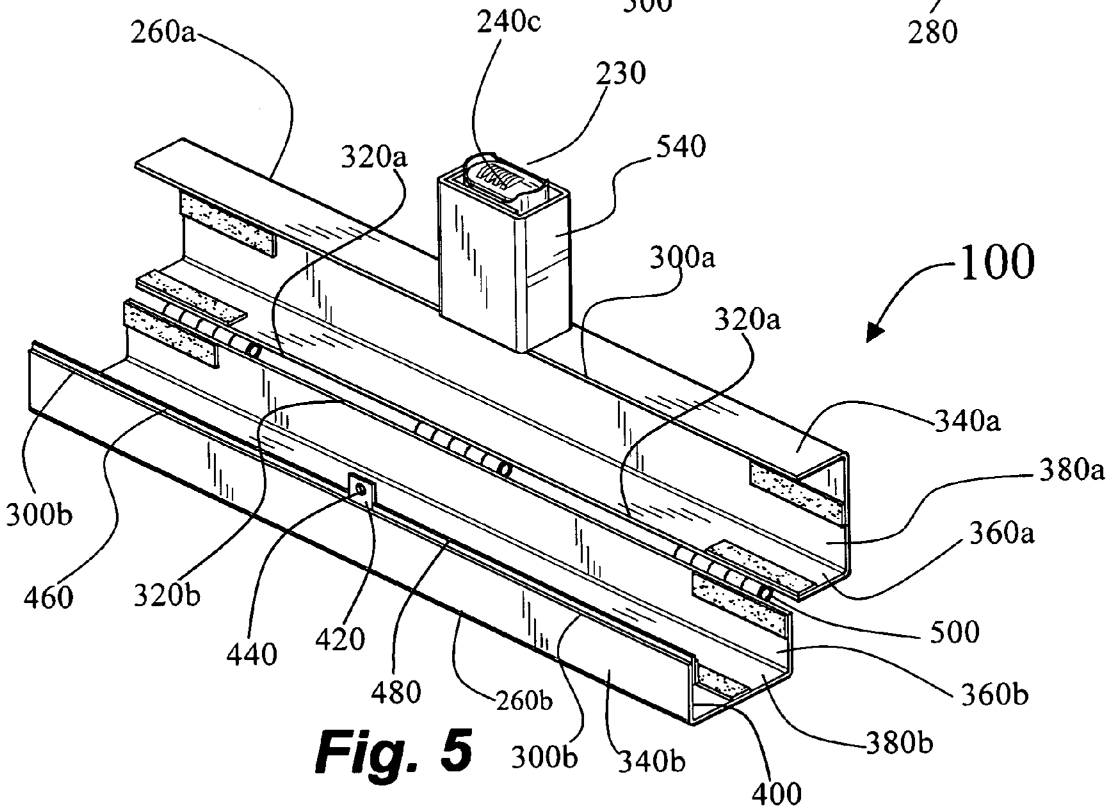
Figure 4A:
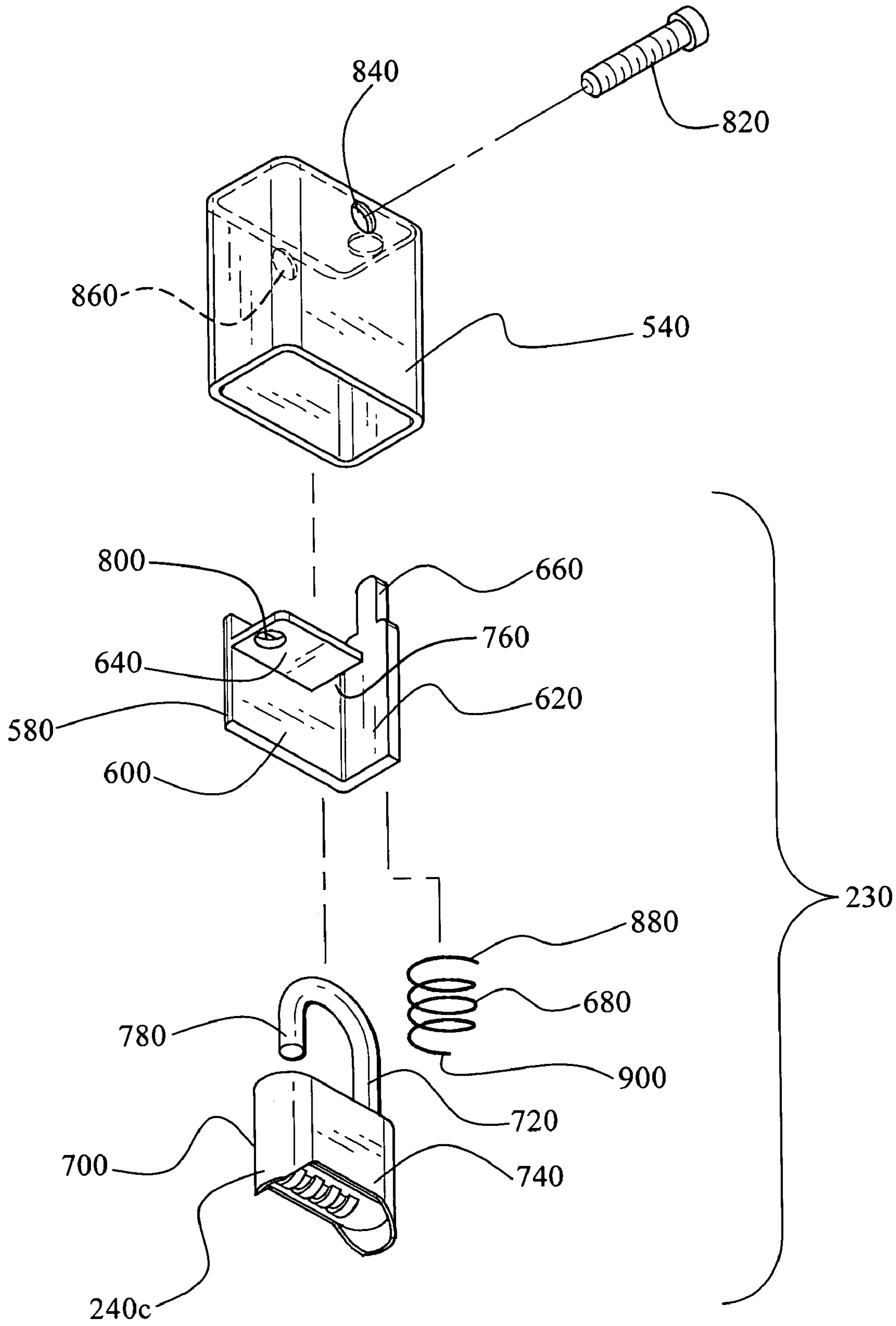
FIG. 4A shows an exploded view of a locking mechanism according to the present invention.

The locking mechanism 230 can comprise, for example, a combination lock 240*c* (shown in FIGS. 4, 4A and 5 herein). This type of locking mechanism is described, for example, in U.S. Patent Publication No. 2005/0099018 A1 published May 12, 2005 to Bryan Witchey, and is shown as part number 540 in the 2005/0099018 Witchey Patent Publication). The 2005/0099018 Witchey Patent Publication is incorporated herein by reference in its entirety.

Figure 2A:
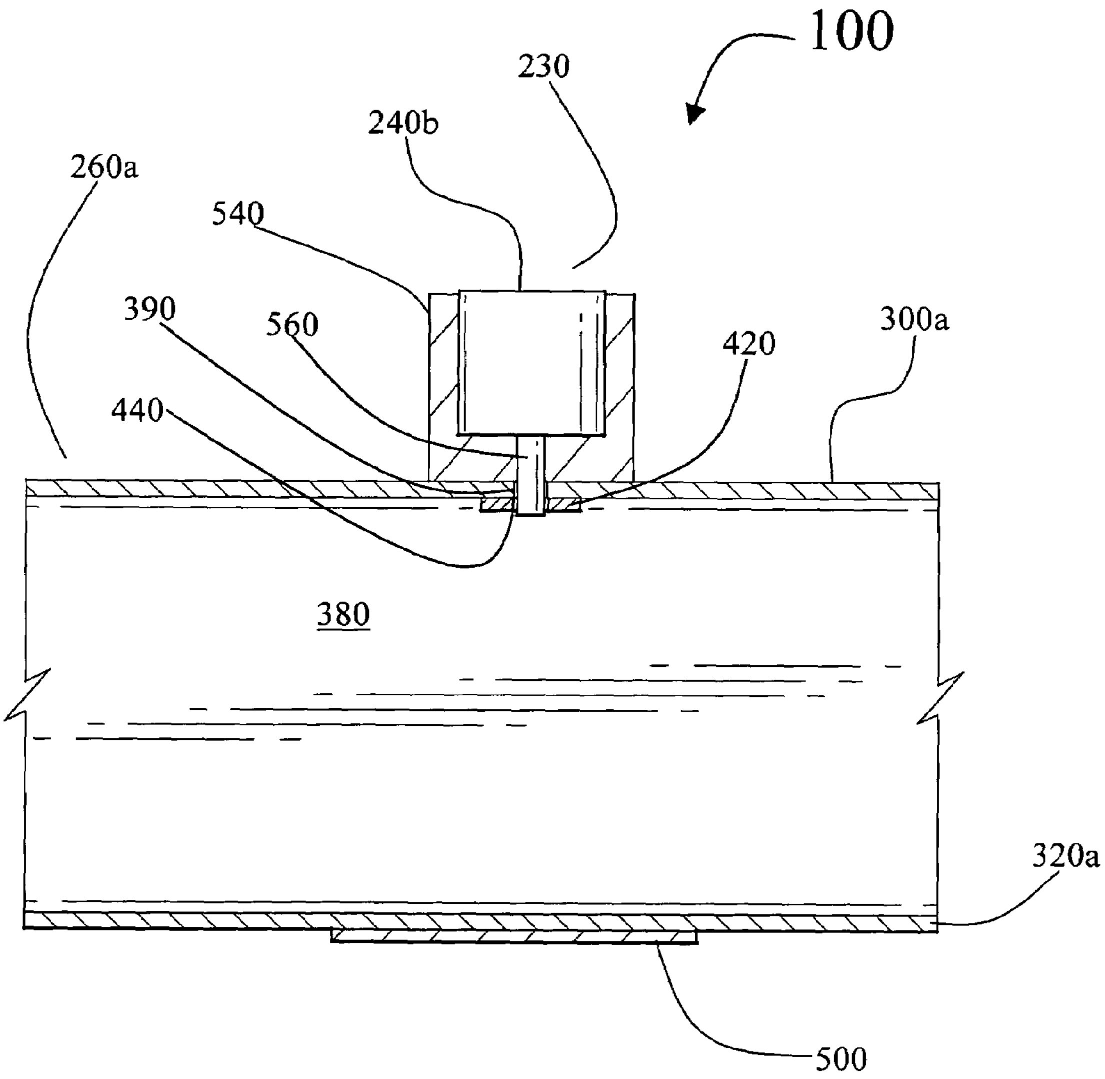
FIG. 2A is a longitudinal section view of the anti-theft device of FIG. 2 showing a key operated barrel shaped spring lock according to the invention.

A locking tab 420 is located on the edge 300*b* of the second elongated bracket 260*b* between ends 180 and 200 and is aligned with aperture 390 upon closing of brackets 260*a* and 260*b* (see FIG. 2A). More specifically, the locking tab 420 is inset with respect to edge 300*b* and approximately in the same plane as the interior surface 400. The locking tab 420 defines an aperture 440 therein. The aperture 440 is, upon closing the brackets 260*a* and 260*b* (see FIG. 2), aligned with aperture 390 (see FIG. 2A). The apertures 390 and 440 play an important role in accommodating a lock pin 560 (see FIG. 2A).

Figure 3A:
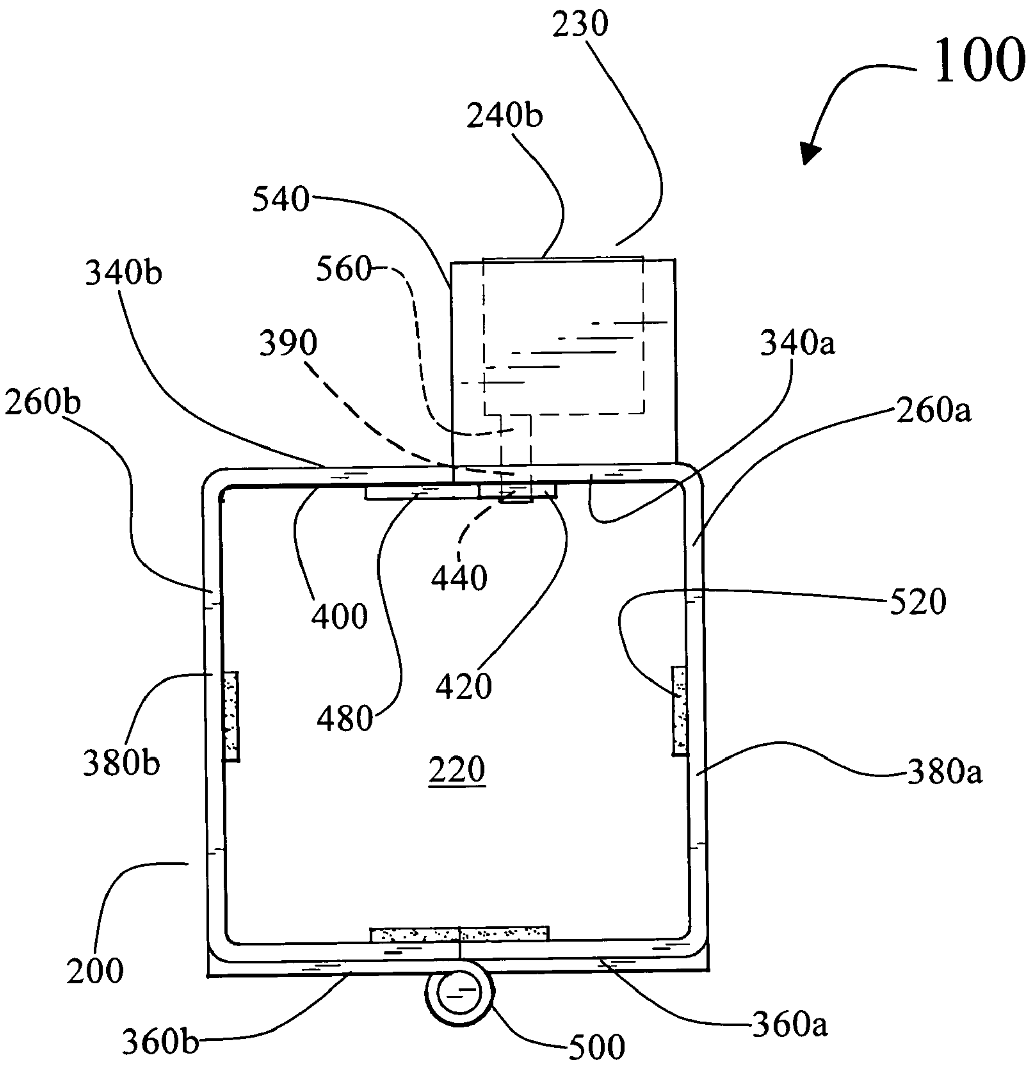
FIG. 3A is an end-view of the anti-theft device of FIG. 2.

The edge 300*b* comprises at least one flange such as, but not limited to, first 460 and second 480 elongated inner flanges. First inner flange 460 is located at least partly between end 180 and locking tab 420, and the second inner flange 480 is located at least partly between end 200 and locking tab 420. The flanges 460 and 480 run along the edge 300*b* and are approximately in the same plane as the locking tab 420 and likewise inset with respect to edge 300*b* and in communication with interior surface 400 (see end-view from end 200, FIG. 3A).

Referring to the FIGURES in general, and FIGS. 2 and 3 in particular, the first 260*a* and second 260*b* elongated brackets are held together by at least one hinge 500. More specifically, edges 320*a* and 320*b* are hingedly coupled by means of at least one hinge 500. By means of the at least one hinge 500, the first 260*a* and second 260*b* elongated brackets can be moved reversibly between an open position and a closed position, see FIGS. 2 and 3, respectively. Optional surface protectors 520 are placed at any suitable position inside shaft 160. The optional surface protectors 520 help to prevent scratches to hydraulic cylinders such as stabilizer leg cylinder 140R.

Referring to the FIGURES in general, and FIGS. 2, 2A, 3 and 3A in particular, the locking mechanism 230 comprises a key operated barrel shaped spring lock 240*b* housed in lock housing 540 located on, and extending outwards from, sidewall 340*a*. The key operated barrel shaped spring lock 240*b* has a lock pin 560 on one end. The key operated barrel shaped spring lock 240*b* is shown in its locked position in solid lines in which the lock pin 560 is shown inserted through aligned apertures 440 and 390. The apertures 440 and 390 become aligned upon closing together first 260*a* and second 260*b* elongated brackets.

FIGS. 4, 4A and 5 show a second embodiment of the invention in which the locking mechanism 230 includes a spring-loaded combination lock mechanism represented by the alphanumeric label "240*c*". The spring-loaded combination lock mechanism 240*c* comprises an L-shaped bracket 580 having first 600 and second 620 sidewalls, a base plate 640 attached to one end of the first sidewall 600 to create a second L-bracket with respect to first sidewall 600, a tongue 660 protruding from one end of second sidewall 620, a spring 680, and a combination lock 700. The combination lock 700 comprises a lock hook 720 and a combination lock housing 740. The spring-loaded combination lock mechanism 240*c* is housed inside housing 540. The tongue 660 is sized and positioned to move easily into and out of apertures 390 and 440 when aligned (i.e., when the first 260*a* and second 206*b* elongated brackets are in a closed position or configuration, see FIG. 2).

It will be understood by a person of ordinary skill in the art that the spring 680 could be left out depending on the ability of the lock hook 720 to spring back into an unlocked position. It should be understood that the exact configuration and position of the spring 680 can vary with respect to the lock hook 720. The spring 680 can be intertwined with the lock hook 720 (as shown in FIGS. 5A and 6A in U.S. Patent Publication No. 2005/0099018, in which the spring member is part number 520 and the lock hook is part number 560).

A gap 760 is located between the base plate 640 and the second sidewall second 620 of bracket 580. The base plate 640 defines a base plate hole 800 therein. The lock hook 720 fits through the gap 760 allowing the end 780 of the lock hook 720 to fit through hole 800 in the base-plate 640.

The component parts of the combination lock mechanism 240*c* are housed inside housing 540. A securing member 820, such as a screw or bolt, is used to hold the combination lock 700 in situ particularly when the combination lock 700 is in an unlocked configuration upon entering the appropriate unlock code. The member 820 also prevents unauthorized removal of combination lock 700 from housing 540. The securing member 820 fits through a securing hole 840 in one side of the lock housing 540. An optional blind hole 860 on the other side of the lock housing 540 secures the securing member 820, thereby preventing unauthorized removal of any part(s) of the lock mechanism 240*c*. The securing member 820 should be resistant to tampering and preferably should not have a regular screw-head. The securing member 820 can be a thief resistant member wherein it is a tamper resistant rivet recessed into aperture 840. For example, the securing member 820 can be welded in place thus rendering the member 820 substantially tamper proof.

It should be understood that the exact configuration and position of the spring 680 can vary with respect to the lock hook 720. The spring 680 can be intertwined with the lock hook 720 (as shown in FIGS. 5A and 6A in U.S. Patent Publication Number 2005/0099018, which is incorporated herein by reference in its entirety), but preferably sits separately within the confines of the lock hook 720 (see FIGS. 5B and 6B in U.S. Patent Publication No. 2005/0099018) where spring end 880 abuts against the base-plate 640 and the other end 900 abuts against the securing member 820 (see FIG. 5B in U.S. Patent Publication No. 2005/0099018), thus providing additional resilient force to operate the lock mechanism 240*c*.

It should be understood that the anti-theft device 100 is not limited to protecting a single type of machinery from theft such as a backhoe BH as shown in FIGS. 1 and 1A. The anti-theft device 100 can be used to help prevent theft or unauthorized control and use of, for example, a backhoe and a range of vehicles that make use of hydraulic arms or extensions such as steering arms in semi-type construction vehicles such as, but not limited to, backhoes, articulating loaders and trucks, dozers, trenchers, excavators, scissor lifts and man-lifts.

It should now be understood based on the foregoing description that the at least one flange such as, but not limited to, first 460 and second 480 elongated inner flanges provide additional security by preventing, for example, a would-be thief from gaining to the lock pin 560 or tongue 660.

In one aspect of the invention, the invention is an anti-theft device (100) comprising a longitudinal shaft (160) divided into first (260*a*) and second (260*b*) elongated brackets and a locking mechanism (230). The first (260*a*) bracket defines first (300*a*) and second (320*a*) longitudinal edges, and the second (260*b*) bracket defines first (300*b*) and second (320*b*) longitudinal edges. Edge (320*a*) and edge (320*b*) are hingedly connected to each other in a longitudinal direction such that the first (260*a*) and second (260*b*) elongated brackets are reversibly moveable between an open and closed position. Edge (300*b*) comprises at least one inner flange and a locking tab (420), the locking tab (420), which defines an aperture (440) therein. The first bracket 260*a* comprises sidewall 340*a*. Sidewall 340*a* includes an aperture (390), wherein the aperture (440) and the aperture (390) are aligned upon closing the first (260*a*) and second (260*b*) brackets. When the first (260*a*) and second (260*b*) brackets are in a closed configuration, the locking mechanism (230) is in operable communication with the aperture (440) and the aperture (390) such that the locking mechanism (230) is capable of reversibly locking the first (260*a*) and second (260*b*) brackets together, and wherein the at least one inner flange substantially prevents illicit tampering with the locking mechanism (230). The locking mechanism (230) can comprise any suitable lock such as, but not limited to, a key operated barrel shaped spring lock (240*b*) or a spring-loaded combination lock (240*c*).

It is to be understood that the present invention is not limited to the embodiments described above, but encompasses any and all embodiments within the scope of the following claims.

I claim:

1. An anti-theft device (100) for receiving an arm therethrough, comprising:

a longitudinal shaft (160) having a longitudinal axis (280), wherein said longitudinal shaft (160) is divided into first (260*a*) and second (260*b*) elongated brackets, said first bracket (260*a*) and said second bracket (260*b*) each have a rectangular U-shaped cross section, said first bracket (260*a*) defines first (300*a*) and second (320*a*) longitudinal edges, said second bracket (260*b*) defines first (300*b*) and second (320*b*) longitudinal edges, wherein said second edge (320*a*) and said second edge (320*b*) are hingedly connected to each other in a longitudinal direction such that said first (260*a*) and second (260*b*) elongated brackets are reversibly moveable between an open position and a closed position transverse to said longitudinal axis (280), said first edge (300*b*) comprises first (460) and second (480) elongated inner flanges with a locking tab (420) extending between said first (460) and second (480) elongated inner flanges on said first edge (300*b*), said locking tab (420) defines an aperture (440) therein, wherein first bracket (260*a*) comprises sidewall (340*a*), wherein said sidewall (340*a*) includes an aperture (390), wherein said locking tab aperture (440) and said sidewall aperture (390) are aligned upon closing said first (260*a*) and second (260*b*) brackets; and a locking mechanism (230), wherein when said first (260*a*) and second (260*b*) brackets are in a closed configuration and said locking mechanism (230) is in operable communication with said locking tab aperture (440) and said sidewall aperture (390) such that said locking mechanism (230) is capable of reversibly locking said first (260*a*) and second (260*b*) brackets together such that first (460) and second (480) elongated inner flanges and said locking tab (420) extend within said first longitudinal edge (300*a*) to substantially prevent illicit tampering with said locking mechanism (230).

2. The anti-theft device (100) according to claim 1, wherein said locking mechanism (230) comprises a key operated barrel shaped spring lock (240*b*).

3. The anti-theft device (100) according to claim 1, wherein said locking mechanism (230) comprises a spring-loaded combination lock (240*c*).

* * * * *